United States Patent [19]

Kaeser

[11] Patent Number: 4,746,808
[45] Date of Patent: May 24, 1988

[54] PORTABLE HYDROELECTRIC GENERATOR UNIT

[76] Inventor: Charles Kaeser, 18, chemin de Rennier, Pully, Switzerland

[21] Appl. No.: 19,975
[22] PCT Filed: Jun. 3, 1986
[86] PCT No.: PCT/CH86/00078
 § 371 Date: Feb. 3, 1987
 § 102(e) Date: Feb. 3, 1987
[87] PCT Pub. No.: WO86/07414
 PCT Pub. Date: Dec. 18, 1986

[30] Foreign Application Priority Data

Jun. 4, 1985 [FR] France .............. 85 08520

[51] Int. Cl.⁴ .............................................. F03B 1/00
[52] U.S. Cl. ........................................ 290/52; 290/54
[58] Field of Search .............. 290/1 A, 43, 52, 54

[56] References Cited

U.S. PATENT DOCUMENTS

| | | | |
|---|---|---|---|
| 1,327,953 | 1/1920 | Hamilton | 415/121 R X |
| 4,246,753 | 1/1981 | Redmond | 290/43 X |
| 4,276,482 | 6/1981 | Crockett | 290/52 |
| 4,293,777 | 10/1981 | Gammell | 290/52 |
| 4,512,201 | 4/1985 | Konrad | 73/861.79 |
| 4,595,841 | 6/1986 | Yaguchi | 290/1 A |

FOREIGN PATENT DOCUMENTS

| | | |
|---|---|---|
| 0066508 | 12/1982 | European Pat. Off. |
| 0125184 | 11/1901 | Fed. Rep. of Germany |
| 0464553 | 8/1928 | Fed. Rep. of Germany |
| 0566940 | 12/1932 | Fed. Rep. of Germany |
| 3247376 | 7/1984 | Fed. Rep. of Germany |
| 0009231 | 1/1913 | United Kingdom |
| 2138510 | 10/1984 | United Kingdom |

*Primary Examiner*—William M. Shoop, Jr.
*Assistant Examiner*—W. E. Duncanson, Jr.
*Attorney, Agent, or Firm*—Sandler & Greenblum

[57] ABSTRACT

The generator unit is driven by a small Pelton turbine (10) having a plurality of injectors (11) each comprised of a single tubular part connected to a ring-shaped distribution chamber. The turbine wheel drives a multiphase synchronous generator (20) having permanent magnets. The alternating voltages produced by the generator are rectified in order to obtain a direct voltage of 24 V. The water flow rate is regulated at the input of the turbine by means of a regulation valve (13) controlled by an electronic regulation unit (23), to automatically control the power of the generator unit as a function of the output voltage variations. Said portable generator unit, which is extremely simple and reliable may be provisionally or permanently used wherever a pressure water connection is available.

12 Claims, 3 Drawing Sheets

PORTABLE HYDROELECTRIC GENERATOR UNIT

The present invention relates to portable hydroelectric generating set comprising a hydraulic turbine of the Pelton type with several jets arranged for connection to a source of water under pressure, an electric generator and a device for controlling the power delivered by the generator.

To provide an electric power supply in case of failure of the mains supply or in locations remote from the public mains supply, for example to supply electric power to an isolated chalet, hydroelectric generator sets have been designed which constitute small power stations fed with a water supply under pressure coming from a stream or caught from a spring. With respect to conventional internal combustion sets, the utilization of a hydraulic turbine provides evident advantages with regard to the running time, which may be extremely long, to operational reliability, to safety and to noise. On the other hand, it necessitates a water supply installation which can not be realized except in a few locations and which is always very expensive. This solution thus leads to the use of sets which have quite high power to cover the needs of at least one household, that is to say several kilowatts, and which are not utilizable as portable sets.

Patent application GB-A No. 2 138 510 describes a set of this type provided with several control valves arranged in parallel and each controlling the waterflow of a respective injector. A regulator detects the frequency variations of the electric current produced and it controls the power of the set accordingly by successively opening or closing the valves. From the constructive point of view, this device is relatively heavy and complex, hence expensive, subject to failure and difficult to transport. From the control point of view, the maintenance of a constant frequency, thus also of a constant speed of rotation of the Pelton wheel, implies a hydraulic pressure situated in restricted limits in order that the speed of the jets may remain compatible with the speed of the wheel. This known generator set can thus not be utilized as a mobile apparatus which may be branched to any supply of water under pressure.

The present invention has the object of providing a portable electric generating set of this type mentioned in the preamble, which is in the form of an assembly of low weight and small volume, capable of being connected to the water supply mains, which is available practically permanently simple manner permitting low construction costs, safe automatic control and a great ease of utilization and maintenance.

To this end, a generator set according to the present invention is characterized in that the turbine comprises a distribution chamber of annular form, disposed coaxially with the wheel and connected to an inlet conduit provided with a valve for controlling the water flow, actuated by the control device and a set of injectors consisting of a single tubular part fitted into a respective opening of the wall of this chamber facing the wheel.

According to a preferred embodiment, each injector is formed of a rectilinear tube comprising a holding flange at its rear end. This tube is preferably cylindrical and is provided with an axial conduit comprising two successive sections of different diameters, namely an inlet section and an ejection section, the ejection section having the form of a cylinder whose diameter is substantially smaller than the diameter or the diameters of the inlet section. To avoid dispersion of the jet, the ejection section has a length at least equal to twice its diameter.

The walls of the annular distribution chamber are preferably formed of two elements which together constitute the body of the turbine.

Thanks to these arangements, the body, the injectors and the turbine wheel may be advantageously made of molded synthetic material.

In a set according to the invention, the generator is advantageously of the low-voltage a.c. type, coupled with a rectifier for delivering an output current of low, substantially continuous voltage. The electric generator is preferably of the multiphase synchronous type having permanent magnets.

With an a.c. generator, power control may be effected in a simple manner. The control device preferably comprises an electronic regulating unit, arranged to control the motor of the control valve as a function of the d.c. output voltage of the set.

According to an advantageous embodiment, this set comprises a housing provided with a carrying handle and containing at least the turbine, the generator and the control device.

An embodiment of a portable generating set according to the invention will be described below by way of a non limiting example, with reference to the accompanying drawings, wherein.

Figure 1:
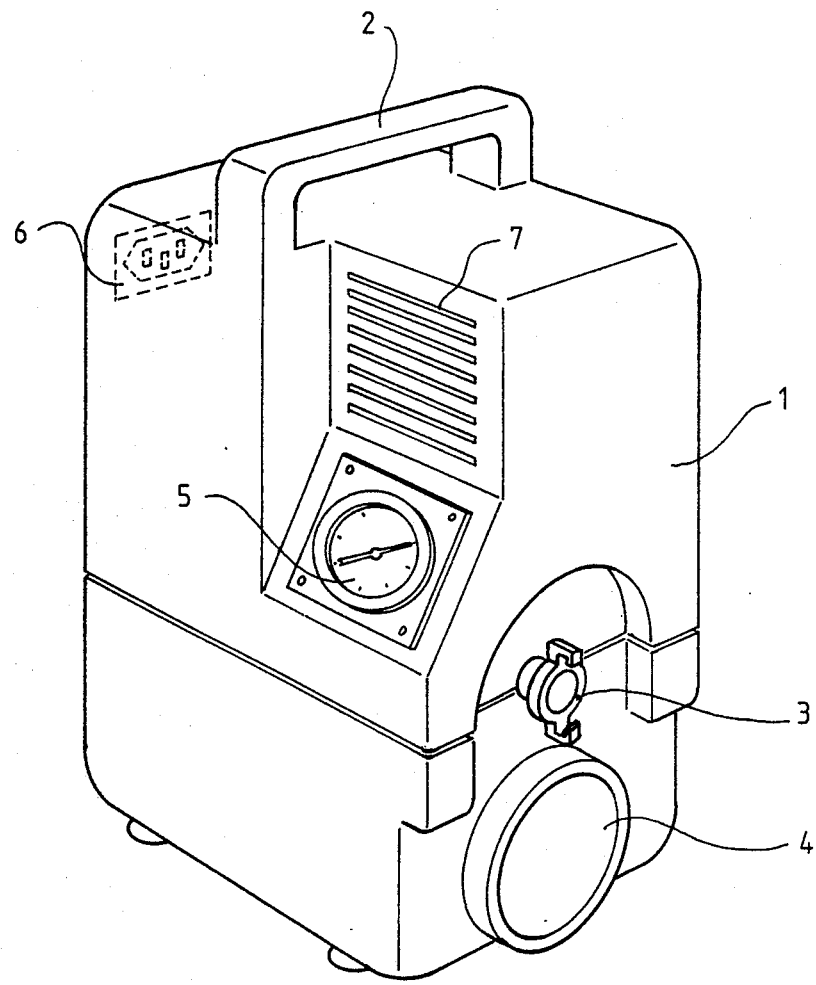
FIG. 1 is a general perspective view of a portable electric generating set according to the invention.

The portable generator set illustrated in FIG. 1 forms a compact and light assembly enclosed in a housing 1 of insulating synthetic material, provided with a transport handle 2. The set externally includes an inlet 3 for connection to a source of water under pressure, a discharge conduit 4 for the utilized water, a manometer 5 indicating the water pressure, a low voltage electric socket 6 and ventilating ears 7.

Figure 2:
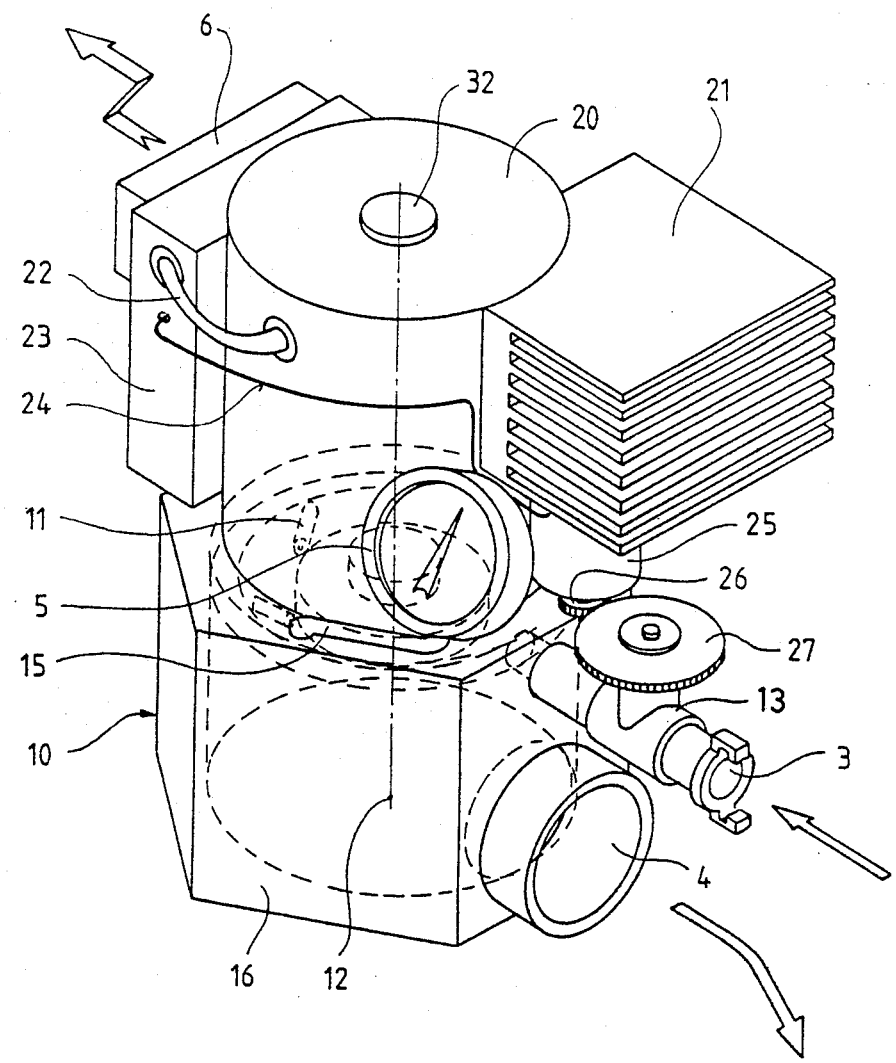
FIG. 2 is a perspective view of the set according to FIG. 1, after removal of the housing.

FIG. 2 represents in greater detail the essential parts of this generating set, such as they appear on removing the housing 1. The lower part of the set is formed of a Pelton turbine 10 with several injectors 11 and a vertical axis 12. The inlet of the turbine is connected to a water inlet connector 3 via a control valve 13, while its outlet is connected to the discharge conduit 4. The distribution means of the turbine, which will be described further on in greater detail, are connnected to the manometer 5 by a pressure tapping 15. The turbine assembly, with the exception of the control valve 13, is enclosed in a sealed body 16 of synthetic material, constituted by two elements screwed to one another.

An electric generator 20 is mounted above the turbine 10 and on the same axis. In the preferred embodiment here described, this generator is of the three-phase synchronous type whose rotor comprises permanent magnets, that is to say that it requires no energizing current. In this regard, a rotor with tangential magnets has been found as effective as a rotor with radial magnets, while at the same time being less expensive, and safer with regard to the fixation of the magnets. This point is important in a machine which is required to operate at varying speeds, which may for example go up to 12000 rpm. For its cooling, the generator is equipped with a finned radiator 21 which is fixed to the outer metallic jacket of the generator.

The three-phase currents produced by the generator 20 are transmitted by a cable 22 to an electronic block 23 including particularly a three-phase rectifier which delivers to the current socket 6 a nominal d.c. voltage of 24 V. Thanks to this low voltage, the utilization of this set and the receivers which it supplies do not present any danger, even if humidity accidentally reaches the electrical parts of the apparatus.

To control the power of the set, in a manner which will be described later on with reference to FIG. 5, the block 23 feeds, by a cable 24, a motor 25 which actuates the control valve 13 by means of a drive pinion 26 mounted on the shaft of the motor 25 and a tooth crown 27 fixed to the actuating shaft of the valve 13. The crown 27 comprises two stops (not shown) which respectively correspond to the closed position and the open position of the valve and which actuate contacts connected to the electronic block 23 to stop feeding the motor 25 when the valve is at the end of its travel.

Figure 3:
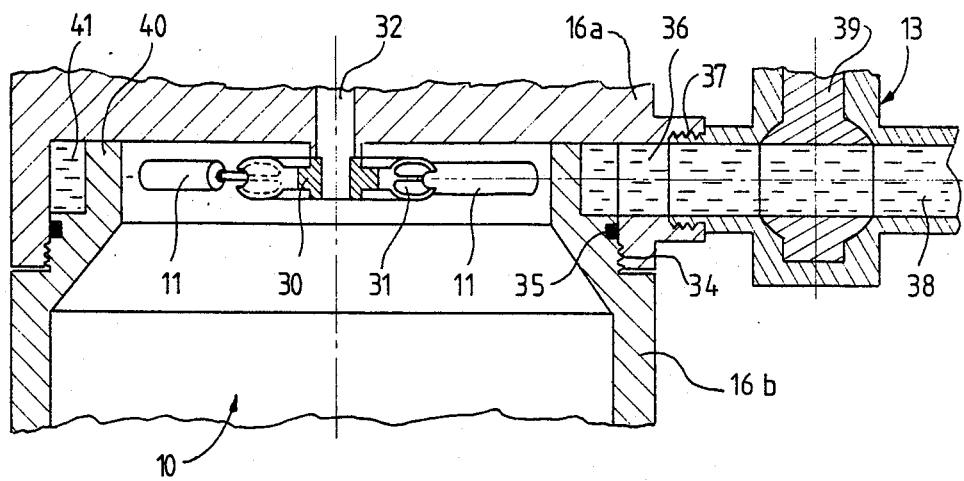
FIG. 3 is a schematic vertical sectional view of the turbine of the generating set of FIGS. 1 and 2.
Figure 4:
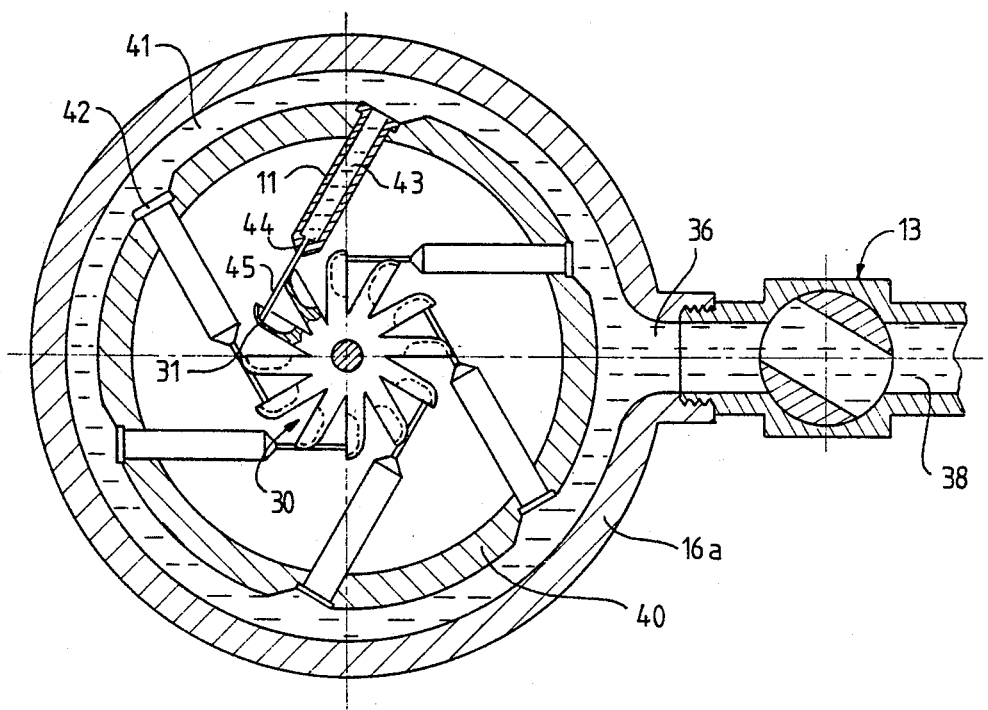
FIG. 4 is a schematic horizontal sectional view representing this turbine and its distribution means.

FIGS. 3 and 4 represent in greater detail the interior of the turbine 10. It is in fact a turbine of the Pelton type with several injectors 11, whose distribution and control means have an extremely simple form. The turbine comprises a wheel 30 with blades 31 of conventional form with double buckets, but of extremely reduced dimensions as in conventional Pelton-type turbines, the wheel rotates in air. For the applications described further on, the diameter of the wheel is of the order of a few centimeters. This wheel may be advantageously fabricated in large series of a molded synthetic material. It is directly fixed to the lower extremity of the generator shaft 32.

The body 16 of the turbine consists of an upper element 16a and a lower element 16b which are screwed together by a threaded connector 34. Sealing is ensured between these two elements by means of an annular packing 35, compressed in an appropriate lodging. The upper element 16a comprises a lateral orifice 36 which is connected by a threaded connector 37 to the control valve 13 comprising an inlet conduit 38 of the turbine. In the represented example, this valve is of the globe type with a shutter 39, solid with a shaft on which the tooth crown 27 represented in FIG. 2 is fixed. The passage for the water across the shutter 39 may be of circular section, equal to that of the conduit 38, or of another form specially arranged to favor the stability of the automatic control.

The lower part 16b of the body of the turbine 10 is provided with an inner rim 40 of cylindrical form, which fits into the upper element 16a, but at a certain distance from the peripheral wall of this element, to define between these two elements 16a and 16b an annular chamber 41 serving as a distribution chamber. This annular chamber is disposed coaxially with the wheel 30 and at the same level therewith and with the inlet conduit 38, with which it communicates by the orifice 38. The inner wall of the distribution chamber 41, consisting of the rim 40, includes a series of substantially cylindrical holes, which are oriented tangentially to the wheel 30 and in which the injectors 11 are fitted. These include at their rear extremity a flange 42 which holds them axially and ensures sealing. If need be, one may place a gasket between the flange 42 and the rim 40. In the represented example, the injectors 11 are six in number, but this number may evidently be different, according to the hydraulic energy available. If need be, some of the injectors 11 could be replaced by plugs if the available water flow is low.

In FIG. 4, one of the injectors 11 is represented in section to show its internal form. The injector 11 has the form of a straight tube, provided with an axial conduit comprising two successive sections of different diameters, that is to say an inlet section 43 whose diameter is relatively large and which extends over the major part of the length of the injector, and a cylindrical ejection section 44 whose diameter is substantially smaller.

The inlet section 43 may be cylindrical or slightly conical. In order to reduce the pressure loss, the minimum diameter of the inlet section 43 is a multiple of that of the section 44. Between the sections 43 and 44, the axial conduit of the injector presents an abrupt variation of the diameter, downstream of which the water flows in the injection conduit without successive turbulence. However, to produce a jet with slight dispersion, the ejection section 44 presents a length which is a multiple of its diameter. This length is preferably two or three times the diameter of this section.

The water under pressure arriving via the inlet conduit 38 and passing through the valve 13 is distributed with a substantially uniform pressure in the distribution chamber 41, which hence feeds the injectors 11 at the same pressure. These transform the pressure energy of the water into kinetic energy, by each forming a jet 45 which strikes the blades 31 so as to make the wheel 30 rotate. The water then leaves the blades while going away from the axis of the turbine and it falls freely into the lower part of the body 16b to reach the water discharge 4 (FIG. 2).

The design of the annular chamber 41 described above thus allows a single control member to be utilized, that is to say the valve 13, for all of the injectors 11. In addition, the injectors do not need to occupy a precise position with respect to the lateral orifice 36 of the distribution chamber. Finally, by separating the two elements 16a and 16b which form the body of the turbine, one may very easily control and maintain the turbine, especially the injector and the wheel. One may readily modify the power range of utilization of the turbine by replacing the injectors by other ones having a different flow rate. It must be remarked in this connection that since all the parts are fabricated of molded synthetic material, their replacement is inexpensive.

Figure 5:
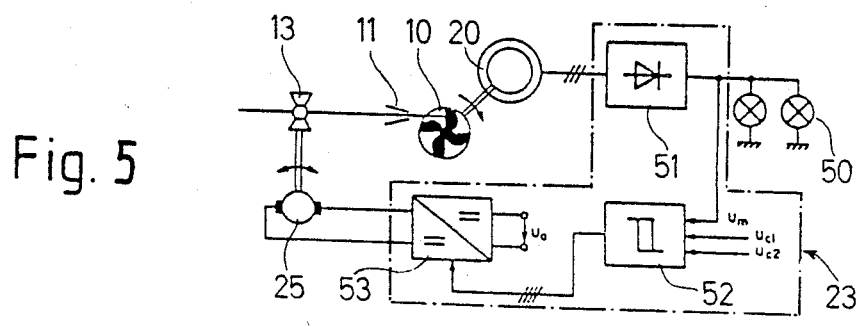
FIG. 5 is a diagram of the automatic control device of the set.

FIG. 5 schematically illustrates the automatic control circuits for controlling the generating set as a function of the electrical load of the consumers 50. The electronic block 23 comprises a three-phase rectifier 51 which receives the alternating currents supplied by the generator 20 and delivers a continuous voltage Um of about 24 V to the consumers and a regulator 52 integrated in the block 23. In addition, this voltage is limited to avoid excessive values during closure of the valve 13.

If Um drops below a certain lower limit Uc1, for example 23 V, the regulator 52 acts upon the convertor 53 which feeds the motor 25 so as to close the valve 13 until the turbine 10 provides to the generator sufficient power to reestablish the voltage. At the same time, the speed of rotation increases. Inversely, if Um exceeds an upper Uc2, for example 25 V, the regulator 52 controls closure of the valve.

A portable generating set such as described above has been found to be utilizable with very hydraulic pressures, comprised between 1 and 7 bars, while providing electric power comprised between 100 and 300 W. One has mesured an overall efficiency of about 50%, with partial efficiencies of 65 to 68% for the Pelton turbine, 80 to 85% for the generator with permanent magnets (8 poles) and 85 to 90% for the rectifier and the control device. With only 5 bars pressure, the set was capable of feeding ten fluorecent lamps of 13 W.

The construction described above allows a portable generating set of very small dimensions and slight weight to be realized. In particular, the turbine 10 fabricated entirely of synthetic material and is much lighter than a gasoline engine of equivalent power. In addition, it is not necessary to transport or to store a reserve of fuel.

Such a generating set is utilizable everywhere where a source of water under pressure is available and evidently a water discharge. For example, it may be branched to a tap in a bathroom or a kitchen, without its operation causing any hinderance to the occupants of the building. On the outside, it may be connected for example to a garden tap, a fire hydrant or any other outlet of pressure water supply mains. The set may likewise be connected to a fixed or provisional water catching installed in a stream, particularly in the mountains, provided that a sufficient drop is available between the water outlet and the set to ensure a sufficient pressure. For example, with a flow rate of 1 l/s at a pressure of 4 bars, the hydraulic power available is 400 W, of which about one half may be converted to electrical energy by the portable generating set. These values are only given by way of example; it is evident that a generating group according to the invention may likewise be designed to utilize a substantially greater hydraulic power.

In addition to the fact that one disposes of a source of water under pressure of several bars in practically all inhabited places, the generating set according to the invention has the advantage of being able to operate automatically during long periods, without necessitating controls, fueling and maintenance operations. It is silent, clean and without danger. That is why it is likewise advantageous for supplying consumers who are remote from electric supply mains, for example, an isolated building, lighting up a building site or a temporary installation, for maintaining the charge of a battery of accumulators, etc.

The present invention is not limited to the embodiments described above, but it extends to all modifications or variants obvious to a person skilled in the art. The alternator may in particular have another number of phases than three or be replaced by a d.c. generator, provided with an adequate control device.

I claim:

1. a portable hydroelectric generator set comprising:
   (a) a hydraulically multi-jet Pelton type turbine including:
      (i) a body having a water inlet for connection to a source of water under pressure and a water discharge conduit;
      (ii) a turbine wheel being mounted on a shaft and rotating in air within said body, said turbine wheel having a plurality of blades;
      (iii) an annular distribution chamber located within said body and being arranged substantially coaxially with said turbine wheel, said annular distribution chamber being in communication with said water inlet, said annular distribution chamber having a wall, said wall having a plurality of openings facing said turbine wheel;
      (iv) a flow control valve in said water inlet for controlling the water flow rate entering said turbine;
      (v) a plurality of injectors, each injector comprising a tubular member fitted into one of said plurality of openings and having an open end to generate a water jet directed onto said blades of said turbine wheel;
   (b) an electric generator having a shaft connected to said turbine wheel; and
   (c) an output power regulating device comprising an electronic regulator electrically connected to a power output of said generator set and electric actuating means adapted to control said flow control valve.

2. Generator set according to claim 1, characterized in that each injector is formed of a straight tube comprising at its rear end an external holding flange.

3. Generator set according to claim 2, characterized in that each injector is a straight cylindrical tube provided with an axial conduit comprising two successive sections of different diameters, namely an inlet section and an ejection section, the ejection section having the form of a cylinder whose diameter is substantially smaller than the diameter or diameters of the inlet sections.

4. Generator set according to claim 3, characterized in that said ejection section has a length at least equal to twice its diameter.

5. Generator set according to claim 1, characterized in that the walls of the annular distirbution chamber are formed of two elements and which together constitute the body of the turbine.

6. Generator set according to claim 5, characterized in that the body, the injectors and the wheel of the turbine are made of molded synthetic material.

7. Generator set according to claim 1, characterized in that the electric generator is of the low voltage a.c. type, coupled to a rectifier to deliver an output current at a low substantially continuous voltage.

8. Generator set according to claim 7, characterized in that the electric generator is of the multphase synchronous type with permanent magnet.

9. Generators set according to claim 7, characterized in that the control device comprises an electronic regulating block arranged to actuate the motor of the control valve as a function of the continuous output voltage of the set.

10. Generators set according to claim 1, characterized in that said generator set comprises a housing provided with a carrying handle and containing at least the turbine, the generator and the control device.

11. Generator set according to claim 1, wherein said injectors are removable.

12. Generator set according to claim 1, wherein said electric generator is mounted outside said turbine body.

* * * * *

UNITED STATES PATENT AND TRADEMARK OFFICE
CERTIFICATE OF CORRECTION

PATENT NO. : 4,746,808

DATED : May 24, 1988

INVENTOR(S) : Charles KAESER

Page 1 of 2

It is certified that error appears in the above-identified patent and that said Letters Patent is hereby corrected as shown below:

In the Abstract, line 13, insert ---,--- after "reliable".

At column 1, line 5, insert ---a--- after "to" and before "portable".

At column 1, line 13, insert ---,--- after "example".

At column 1, line 19, change "advantagees" to ---advantages---.

At column 1, line 31, change "waterflow" to ---water flow---.

At column 1, line 47, change "this" to ---the---.

At column 1, line 51, insert ---and in all inhabited places, this assembly being designed in a particularly--- after "permanently".

At column 2, line 35, change "." to ---,---.

At column 3, line 32, insert ---.--- after "dimensions".

At column 3, line 32, change "as" to ---As---.

At column 4, line 67, insert ---limit--- after "upper".

At column 5, line 2, insert ---varied--- after "very".

At column 5, line 5, change "mesured" to ---measured---.

At column 5, line 10, change "fluorecent" to ---fluorescent---.

At column 5, line 25, insert ---,--- after "connected".

UNITED STATES PATENT AND TRADEMARK OFFICE
CERTIFICATE OF CORRECTION

PATENT NO. : 4,746,808

DATED : May 24, 1988

INVENTOR(S) : Charles KAESER

It is certified that error appears in the above-identified patent and that said Letters Patent is hereby corrected as shown below:

At column 5, line 26, insert ---,--- after "example".

At column 5, line 61, i.e., at claim 1, line 1, change "a" to ---A---.

At column 5, line 62, i.e., at claim 1, line 2, change "hydraulically" to ---hydraulic---.

At column 6, line 41, i.e., at claim 5, line 2, change "distirbution" to ---distribution---.

At column 6, line 42, i.e., at claim 5, line 3, delete "and".

Signed and Sealed this

Nineteenth Day of June, 1990

Attest:

HARRY F. MANBECK, JR.

*Attesting Officer*     *Commissioner of Patents and Trademarks*